US012762179B2

(12) United States Patent
Jha et al.

(10) Patent No.: US 12,762,179 B2
(45) Date of Patent: Oct. 13, 2026

(54) SYSTEMS AND METHODS FOR IMAGE CONTENT INDEXING AND SEARCH

(71) Applicant: OPEN TEXT INC., Menlo Park, CA (US)

(72) Inventors: Ravi Ranjan Jha, Bangalore (IN); Dhiman Karmakar, Bangalore (IN)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/394,277

(22) Filed: Dec. 22, 2023

(65) Prior Publication Data

US 2025/0209111 A1 Jun. 26, 2025

(51) Int. Cl.
*G06F 16/51* (2019.01)
*G06F 16/583* (2019.01)
*G06V 10/774* (2022.01)

(52) U.S. Cl.
CPC ............ *G06F 16/51* (2019.01); *G06F 16/583* (2019.01); *G06V 10/774* (2022.01); *G06V 2201/07* (2022.01)

(58) Field of Classification Search
CPC ............................... G06F 16/51; G06F 16/583
See application file for complete search history.

(56) References Cited

U.S. PATENT DOCUMENTS

| | | | | |
|---|---|---|---|---|
| 2019/0289359 A1* | 9/2019 | Sekar | ................. | H04N 21/4333 |
| 2021/0064704 A1* | 3/2021 | Yang | ....................... | G06F 40/58 |
| 2021/0224312 A1* | 7/2021 | Harikumar | ............ | G06F 16/532 |
| 2022/0414142 A1* | 12/2022 | Chang | ..................... | G06V 10/82 |
| 2024/0013506 A1* | 1/2024 | Yao | .................. | G06V 30/19173 |
| 2024/0096119 A1* | 3/2024 | Gurnett | .................. | G06V 20/70 |
| 2024/0135751 A1* | 4/2024 | Babazaki | ............... | G06V 40/20 |

* cited by examiner

*Primary Examiner* — Khanh B Pham
(74) *Attorney, Agent, or Firm* — Sprinkle IP Law Group

(57) ABSTRACT

A computer-implemented method for content search, comprising accessing an image stored or to be stored in a repository that is searchable using a search index, applying a machine learning model to detect objects and actions in the image and updating the search index to index the image using the objects and actions detected in the image to enable searching of the image by the objects and actions detected in the image.

23 Claims, 6 Drawing Sheets

```
2023-07-26T13:17:37.950Z DEBUG [searchsvc-agent]  c.o.s.a.d.c.ContentIndexingEventProducer :
sending event to topic contentIndexing. key: 090015fa8006b1ef; message: {
        "eventId": "090015fa8006b1efd2repo1690377452833",
        "id": "090015fa8006b1ef",
        "url": "http://fetcher1:8900/content-fetcher/
fetch?token=eyJhbGciOiJIUzI1NiJ9.eyJpc3MiOiJkY3RtIiwiaWF0IjoxNjkwMzc3NDUzLCJzdWIiOiJ7X
CJkb2NiYXNlTmFtZVwiOlwiZDJyZXBvXCIsXCJvYmplY3RJZFwiOlwiMDkwMDE1ZmE4MDA2YjFlZl
wiLFwiY29udGVudElkXCI6XCIwNjAwMTVmYTgwMDkwMmE4XCIsXCJjb250ZW50VHlwZVwiOlwia
W1hZ2UvanBlZ1wifSJ9.x5AtOtQozLTyDeZX0MayJ4UvlfjOjcXa5Qe1Bs0kSUA",
        "indexName": "d2repo",
        "format": "jpeg",
        "timestamp": 1690377453555,
        "version": "1"
}
```

202

204

200

FIG. 2

300

```
13:17:55.888 [org.springframework.kafka.KafkaListenerEndpointContainer#0-0-C-1] INFO
c.o.s.or.extracter.ObjectRecognizer - Returning detected objects - [
        class: "Person", probability: 0.25614, bounds: [x=0.092, y=0.029, width=0.851, height=0.719]
        class: "Swimming pool", probability: 0.25285, bounds: [x=0.056, y=0.042, width=0.924,
height=0.791]
        class: "Human arm", probability: 0.12783, bounds: [x=0.441, y=0.008, width=0.435,
height=0.527]
        class: "Person", probability: 0.11890, bounds: [x=0.200, y=0.335, width=0.702, height=0.381]
        class: "Woman", probability: 0.10930, bounds: [x=0.092, y=0.029, width=0.851, height=0.719]
        class: "Tree", probability: 0.10762, bounds: [x=0.054, y=0.005, width=0.531, height=0.341]
        class: "Human face", probability: 0.10261, bounds: [x=0.309, y=0.411, width=0.172,
height=0.213]
]
13:17:58.087 [org.springframework.kafka.KafkaListenerEndpointContainer#0-0-C-1] INFO
c.o.s.or.extracter.ObjectRecognizer - Returning detected actions - [
        class: "Swimming", probability: 0.94943
        class: "Rafting", probability: 0.00201
]
```

302

304

FIG. 3

400

```
2023-07-26T13:17:58.205Z DEBUG [searchsvc-
agent,b5f15b8ea761d60f158f843d61491d65,05edbd1e1fa5a7ae] 1 --- [ntainer#1-0-C-1]
c.o.s.a.d.lunr.AgentDctmJupiterClient    : Indexing Request : {
        "operations": [
                {
                        "operation": "update",
                        "eventId": "090015fa8006b1efd2repo1690377452833",
                        "id": "090015fa8006b1ef",
                        "content": {
                                "extracted_metadata": "'Person' 'Swimming pool'  'Human arm'
'Woman' 'Tree' 'Human face' 'Swimming'"
                        },
                        "tenant_id": null,
                        "subscription_id": null,
                        "content_ref": null
                }
        ]
}
```

FIG. 4

SYSTEMS AND METHODS FOR IMAGE CONTENT INDEXING AND SEARCH

TECHNICAL FIELD

This disclosure relates generally to data storage. More particularly, this disclosure relates to methods and systems enhanced indexing and searching of content.

BACKGROUND

Enterprise environments have been steadily growing more complicated, encompassing an ever-expanding amount of increasingly complex digital content (or just content). Digital content, in essence, is anything that exists in a binary format that may exist in the enterprise environment or otherwise be utilized by the enterprise. The digital content of an enterprise may thus include a variety of digital assets including text, images, aural or video content, templates used in content delivery, objects, or other types of content. For purposes of this disclosure, the terms document and content will be used interchangeably and understood to have the same definition as digital content.

Content management systems allow enterprises to manage content by controlling the access, editing, updating, versioning, searching, etc. of content. Content management systems are often capable of storing and managing a variety of content types, such as word processing documents, spreadsheets, graphics, video files, audio files and other content. Content management systems have limitations, however, when dealing with certain types of content. For example, many content management systems typically provide limited search capability for image files and often provide no mechanism to search within the content of the media files.

As such, improved mechanisms for indexing and searching non-text content are desired.

SUMMARY

Attention is thus directed to the efficient content transfer systems and methods disclosed herein.

Embodiments of the present disclosure provide systems and methods for indexing and searching within non-text content. Even more particular embodiments of the present disclosure provide systems and methods for indexing and searching within image content. Some embodiments employ trained machine learning models, such as trained deep neural network machine learning models to infer objects and actions from images. In a more particular embodiment, a trained machine learning model is applied to infer objects in the images and a trained machine learning model is applied to the inferred objects and other related information to infer actions.

One aspect of the present disclosure includes a computer-implemented method for content search. Other aspects of the present disclosure include related systems and computer readable media. The method comprises accessing an image stored or to be stored in a repository that is searchable using a search index, applying a machine learning model to detect objects and actions in the image, and updating the search index to index the image using the objects and actions detected in the image to enable searching of the image by the objects and actions detected in the image. In some embodiments, the objects and actions detected in the image are sent to the index database as atomic metadata.

The method may further include receiving a search query from a client and servicing the search query. According to one embodiment, servicing the search query comprises using the search index to search the repository, determining that the image matches the search query based on an object or an action included in the search index for the image matching the search query, based on a determination that the image matches the search query, generating a result that includes the image and returning the result to the client.

The search query may include a search term. According to one embodiment, determining that the image matches the search query comprises determining that the object or the action matches the search term or a synonym of the search term, considering lemmas, in some embodiments.

Embodiments can include processing a content indexing request that includes a reference to the image in the repository and servicing the content indexing request, wherein servicing the content indexing request. Servicing the content indexing request can include, according to one embodiment, using the reference from the content indexing request to retrieve the image from the repository, applying of the machine learning model to the image to detect the objects and actions in the image, and generating a content indexing response that comprises the objects and actions detected in the image.

Some embodiments include receiving the content indexing response to the content indexing request, reading the objects and actions detected in the image from the content indexing response and sending the objects and actions detected in the image and read from the content indexing response to an index database to update the search index.

A first process may generate the content indexing request and a second process may service the content indexing request, where the first process and second process are asynchronous processes. According to one embodiment, the first process writes the content indexing request to a topic and the second process reads the content indexing request from the topic.

Some embodiments further include translating the objects and actions detected in the image from a first language to a second language prior to updating the search index with the objects and actions detected in the image.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 is a diagrammatic representation of one embodiment of a content indexing request;

FIG. 3 is a diagrammatic representation of one embodiment of example extracted metadata produced through image processing;

FIG. 4 is a diagrammatic representation of one embodiment of an index update request;

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. Content management systems store a wide variety of content. However, content management systems often provide limited search capability for non-text content, such as images, and often provide no mechanism to search within the non-text content.

To those ends, among others, attention is now directed to the systems and methods for indexing and searching in media content. Embodiments described herein provide mechanisms for indexing media content in a manner that allows for efficient searching in/on the media content and expands the indexing beyond objects recognized in the images. According to one embodiment, a content management system includes an image processing service that uses a machine learning model to label the media content with objects or actions detected in the content. In an even more particular embodiment, the image processing service processes images using an object detection machine learning model to detect objects in the image and processes the detected objects to infer the actions occurring in the images. Thus, the content management system can index media content with the detected objects and actions.

Figure 1:
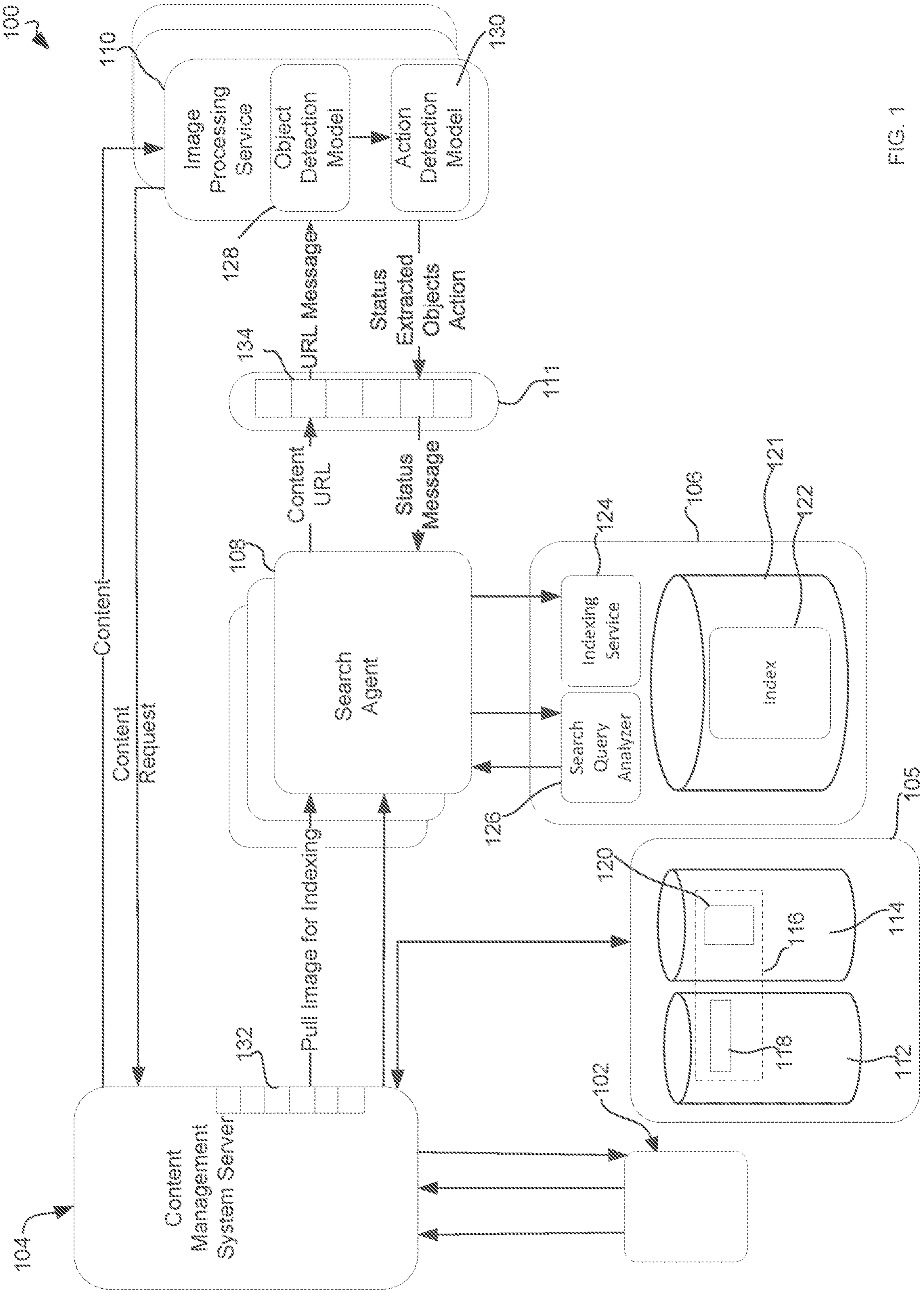
FIG. 1 is a diagrammatic representation of one embodiment a content search system.

FIG. 1 is a diagrammatic representation of one embodiment of a content search system 100 for content indexing and searching. Content search system 100 includes a client application 102, a content management system server 104, a repository 105, a search engine 106, a search agent 108, an image processing service worker 110 and a messaging server 111. There may be multiple instances of content management system server 104, repository 105, search engine 106, search agent 108, messaging server 111 or image processing service worker 110 in content search system 100.

Content management system server 104 manages, protects, and imposes structure on content in repository 105. According to one embodiment, the content management system is object-oriented, with content management system server 104 storing each item of managed content as a content object that includes a content file and associated content object metadata that references the associated content file. For example, content management system server 104 manages a content item as a content object 116 that includes content object metadata 118 and a content file 120 (e.g., an image file, a video file, a word processing file, or other type of file). The content object metadata 118 includes metadata such as a content object id for content object 116, a reference to content file 120, and other content management metadata used by content management system server 104 for managing the content. Content management system server 104 provides access to content objects in repository 105 using uniform resource locators (URLs).

To this end, repository 105 comprises a metadata store 112 for storing the metadata of content objects and a content file store 114 for storing the content files of the content objects. The content object metadata and content files can be stored according to any suitable storage technology. In one embodiment, content management system server 104 stores content object metadata as records in a relational or non-relational database and content files in a file system, a database (e.g., where files are stored as blobs or structures in a relational database or non-relational database), or in a store that manages logically related data as files.

Search engine 106 provides search capabilities for searching for content objects in repository 105. Search engine maintains, in index database 121, an index 122 of content objects in repository 105 and includes an indexing service 124 for updating and managing index 122 and a query analyzer 126 to process and respond to search queries using index 122. Search engine 106, according to one embodiment, indexes content object metadata of the content objects and the content of the content objects—that is, the content within the content files. Content indexing may be limited based on the type of content.

According to one embodiment, when content management system server 104 creates a content object (or at the occurrence of another predefined event), content management system server 104 provides content object metadata to search engine 106 (e.g., via search agent 108) for indexing to allow searching based on the content object metadata. For example, when content management system server 104 creates content object 116, content management system server 104 provides the content object identifier and indexable metadata attributes (e.g., all or an indexable subset of the metadata attributes) of content object 116 (e.g., via search agent 108) to search engine 106 for indexing. Further, when a user or application updates indexable metadata of content object 116, content management system server 104 provides the content object identifier and updated indexable metadata attributes to search engine 106 to update index 122.

With respect to content indexing, content search system 100 can include various services for processing content to extract information from within the content. For example, content search system 100 can include a text processing pipeline that content management system server 104 uses to extract text from content files that contain extractable text (such as, but not limited to, .txt files, word processing files, spreadsheet files, documents that can been processed using optical character recognition, etc.). The extracted text is provided to search engine 106 for indexing. As such, content objects that contain text content can be indexed and searched based on text from within the content files.

In particular, content search system 100 includes image processing service worker 110 to extract information from image content to allow indexing and searching within the images. Image processing service worker 110 includes or utilizes an object detection model 128. Object detection model 128 comprises a deep learning or other machine learning object detection model trained to label images based on classes of objects detected in the images. In some embodiments, object detection model 128 comprises multiple models, with different models trained to detect different classes of objects.

Object detection model 128, according to one embodiment, performs object localization. With object localization, a bounding box for an instance of the class is provided for the class label. The object localization can be single-object localization or multiple-object localization. With single-object localization, object detection model 128 produces a list of object classes detected and a bounding box definition (e.g., position and scale) for one instance of each object class detected—for example, a bounding box for the highest probability instance. With multiple-object localization, object detection model 128 produces a list of object classes detected and a bounding box definition for each instance of the object class detected (e.g., produces a label with a respective bounding box for every instance of an object class).

Image processing service worker 110 further includes or utilizes further detection models to detect classes represented in the image using text related to the image, including the labels output by object detection model 128. For example, image processing service worker 110 uses action detection model 130 to detect actions depicted in the images. Action detection model 130 comprises a deep learning or other machine learning model trained to analyze labels, and, in some embodiments, additional information associated with images, to classify the images based on classes of actions represented by the images. Action detection model 130 may comprise multiple models, with different models trained to detect different classes of actions.

Action detection model 130, according to one embodiment, is trained to infer actions from the object classes output by object detection model 128. In an even more particular embodiment, action detection model 130 is trained to infer actions from input data that includes classes and associated bounding box definitions produced by object detection model 128. For example, in some embodiments, action detection model 130 is trained to infer actions from the object classes detected in the image and the proximity of instances of the object classes to each other in an image.

In some embodiments, action detection model 130 is trained to recognize actions using additional text. In such an embodiment, the related text for an image input to action detection model 130 includes text from the labels produced by object detection model and additional related text, such as descriptive text from the content object metadata, or text extracted from the image using object character recognition, or other related text.

Thus, image processing service worker 110 can output objects and actions detected in an image. These objects and actions can be provided to search engine 106 for indexing. As such, a content object containing an image can be indexed based on the content of the image. In some embodiments, content search system 100 filters out low confidence objects and actions from indexing.

In operation, content management system server 104 detects an event that triggers indexing of a content item. For example, content management system server 104 may be triggered to index content file 120 when client application 102 uploads content file for storage or modifies content file 120. As discussed, when content management system server 104 creates content object 116 to manage content file 120, content management system server 104 provides the content object identifier and indexable metadata attributes (e.g., all or an indexable subset of the metadata attributes) of content object 116 (e.g., via search agent 108) to search engine 106 for indexing.

Further, if the content item has indexable content, content management system server 104 initiates a content indexing task to index the content of content file 120. Content management system server 104 writes a content indexing request (e.g., produces a content indexing event) to content indexing job queue 132, including content object metadata from content object 116 (e.g., content object id, content format, and a reference to the content to be indexed, such as the URL). An available search agent 108 consumes the content indexing request from content indexing job queue 132 and, because the content indexing request relates to indexing an image, writes a content indexing request to queue 134 used by image processing services. An available image processing service worker 110 consumes the content indexing request from queue 134 and services the content indexing request.

Turning briefly to FIG. 2, one embodiment of a content indexing request 200 from search agent 108 to image processing service worker 110 is illustrated. Here, the request includes the content object identifier 202 of content object 116 and the URL 204 for content object 116.

Returning to FIG. 1, image processing service worker 110 retrieves the image from repository 105 using the reference from the content indexing request. For example, image processing service worker 110 requests content file 120 from content management system server 104 using the URL provided by search agent 108 and content management system server 104 returns the requested content. Image processing service processes content file 120 using object detection model 128 to produce first labels indicating classes of objects detected in the image, where each label includes an object class detected in the image. Object detection model 128 may provide additional information for each label, such as probability (confidence) for the object class or a bounding box definition for an instance of the object class detected in the image.

The following provides an example of labels and associated label information for that could be produced for an image (e.g., content file 120) by one embodiment of a multiple-object localization object detection model 128 that is trained to perform object localization for sports-related objects and to provide a label for each instance of an object class:

class: "Person", probability: 0.25614, bounds: [x=0.092, y=0.029, width=0.851, height=0.719]

class: "Swimming pool", probability: 0.25285, bounds: [x=0.056, y=0.042, width=0.924, height=0.791]

class: "Human arm", probability: 0.12783, bounds: [x=0.441, y=0.008, width=0.435, height=0.527]

class: "Person", probability: 0.11890, bounds: [x=0.200, y=0.335, width=0.702, height=0.381]

class: "Woman", probability: 0.10930, bounds: [x=0.092, y=0.029, width=0.851, height=0.719] class: "Tree", probability: 0.10762, bounds: [x=0.054, y=0.005, width=0.531, height=0.341]

class: "Human face", probability: 0.10261, bounds: [x=0.309, y=0.411, width=0.172, height=0.213].

In this example, each label comprises an object class detected and has an associated confidence for a detected instance of the class and bounding box definition for the respective instance of the object class detected. Here, object detection model 128 produces two labels for the "Person" class, one for each instance detected in. A single-object localization object detection model 128, on the other hand, would only produce one label for the Person class; for example, the label for the highest probability instance.

Image processing service worker 110 further processes information related to content file 120 using action detection model 130 to detect actions represented in content file 120. The information related to content file 120 includes labels produced by object detection model 128. In some embodiments, the input data for action detection model 130 further includes at least one of the bounding box definitions associated with the labels or the confidences associated with the labels. The input data for action detection model 130 may further include additional information, such as text from content metadata or text extracted from the content file.

In one embodiment, image processing service worker 110 generates label feature vectors from the labels produced for an image by object detection model 128. A feature vector for a label includes a feature representing the object class from the label. The feature vector for a label may further include additional features, such as features representing one or more of the probability or the bounding box specified for the label. Image processing service worker 110 can combine the label features generated for an image to produce a combined feature and input the combined feature vector to action detection model 130. In some embodiments, the combined feature vector also represents other text related to an image, such as text from the content object metadata or text extracted from the image.

Action detection model 130 produces second labels for the image indicating classes of actions inferred from the text of the labels, where each second label includes a detected class of action. Action detection model 130 may produce additional information for each label, such a confidence for the label.

Image processing service worker 110 may take advantage of other text processing services in content search system 100 to further process the labels produced by object detection model 128 and action detection model 130. For example, if content search system 100 includes a translation service and the content indexing request indicates that a particular language should be used for indexing, image processing service worker 110 can invoke the translation service to translate the object/action names detected to convert them to the target language. These converted strings can be added to the content indexing response.

Image processing service worker 110 writes a content indexing response to queue 134 that includes the objects and actions detected in the image. According to one embodiment, if the detection task was successful, image processing service worker 110 writes a success status message along with extracted metadata (e.g., detected objects and actions) to queue 134. If the object/action detection failed, image processing service worker 110 writes a failed message to queue 134. Turning briefly to FIG. 3, one embodiment of extracted metadata 300 for an image is illustrated, including object labels 302 with associated probabilities and bounding boxes and action labels 304 with associated probabilities.

An available search agent 108 consumes the content indexing response from queue 134. For a failure message, search agent 108 returns an indication of a failure to content management system server 104 or search engine 106 or initiates other failure processing. For a success message, search agent 108 generates a request to update the index for content file 120 where the request includes the labels (e.g., objects and actions) detected in the image. In some embodiments, search agent 108 filters out duplicative labels and labels that do not meet a confidence threshold.

FIG. 4 illustrates one embodiment of an index update request 400 to update search index 122 for content object 116 using the extracted metadata 300. In this example, search agent 108 filters out the duplicative "Person" label to only include one instance of "Person" in index update request and filters out the low confidence label "Rafting".

Returning to FIG. 1, search agent sends the index update request to indexing service 124 to cause search engine 106 to update index 122 for content object 116 with the extracted metadata provided in the index update request.

A user may submit a full text search query to content management system server 104 via client application 102. Content management system server 104 forwards the query to search agent 108, which in turn provides the query terms to search query analyzer 126. Search query analyzer 126 searches index 122 for content objects matching the search terms. For example, if the search query includes the term "swimming," search query analyzer 126 will identify content object 116 as responsive to the search based on search index 122 having been updated to include "swimming" for content object 116.

Search engine 106 returns a search result to search agent 108, where the search result includes a reference to the content objects that are responsive to the search query (e.g., by content object id, URL or other reference) and search agent 108 returns the search result to content management system server 104. Content management system server 104 can return a search result with a reference to the content objects that are responsive to the search query to client application 102. In some embodiments, content management system server 104 retrieves the responsive content files and returns the images in the search results.

Further, in some embodiments, search query analyzer 126 can search on synonyms and lemmas of the search names. For example, search query analyzer 126 may maintain a dictionary of synonyms for the object and action names supported by the image processing service. Such dictionary may include, for example, "backstroke", "front stroke", and "swimming" as synonyms as just one example. In such an embodiment, the user could search for "backstroke", "front stroke", or "swimming", and would still see content object 116 in the result due to content object 116 being associated with "swimming" in index 122.

In one embodiment, content search system 100 uses an event streaming architecture for distributing events. In an even more particular embodiment, content search system 100 uses an architecture in which events are written to, stored in, and consumed from topics, where topics can be multi-producer and multi-subscriber. In an even more particular embodiment, content search system 100 uses a Kafka event streaming (Kafka is an open-source distributed even streaming platform from The Apache Software Foundation Corporation) (KAFKA and APACHE are trademarks of The Apache Software Foundation Corporation of Wilmington, Delaware) (any trademarks or trade names used herein remain the property of their respective owners). In one example of such an embodiment, content management system server 104 writes an indexing request (e.g., produces a content indexing event) to a topic subscribed to by search agent 108 and search agent 108 writes an indexing request (produces a content indexing event) to a topic subscribed to by image processing service worker 110. Upon servicing the request to generate a content indexing response to the request, image processing service worker 110 writes the content indexing response to the same topic from which it consumed the content indexing request. Search agent 108 uses this topic for sending an atomic indexing request to search engine 106.

In some embodiments, content search system 100 employs scalable asynchronous processing of images with trained deep neural network machine learning models to infer objects and actions. For example, in some embodiments, search agent 108 and image processing service worker 110 are asynchronous processes that communicate via a message/event queue.

Further, embodiments of the present disclosure can similarly be used to process video data. For example, on retrieving a video file, image processing service worker 110 can break the video into individual frames (i.e., individual frames), process all or selected frames using object detection model 128 and action detection model 130 to generate labels for the frames, and combine the labels generated for individual frames into a label set for the overall video.

While embodiments have been discussed using the example of infer action classes from the objects detected in an image, embodiments of image processing service worker 110 can utilize other types of detection models. As just one example, a detection model may be trained to use the output of object detection model 128 to detect classes of events (e.g., a birthday party, Christmas, etc.). Thus, a variety of different types of content can be extracted from images.

Figure 5:
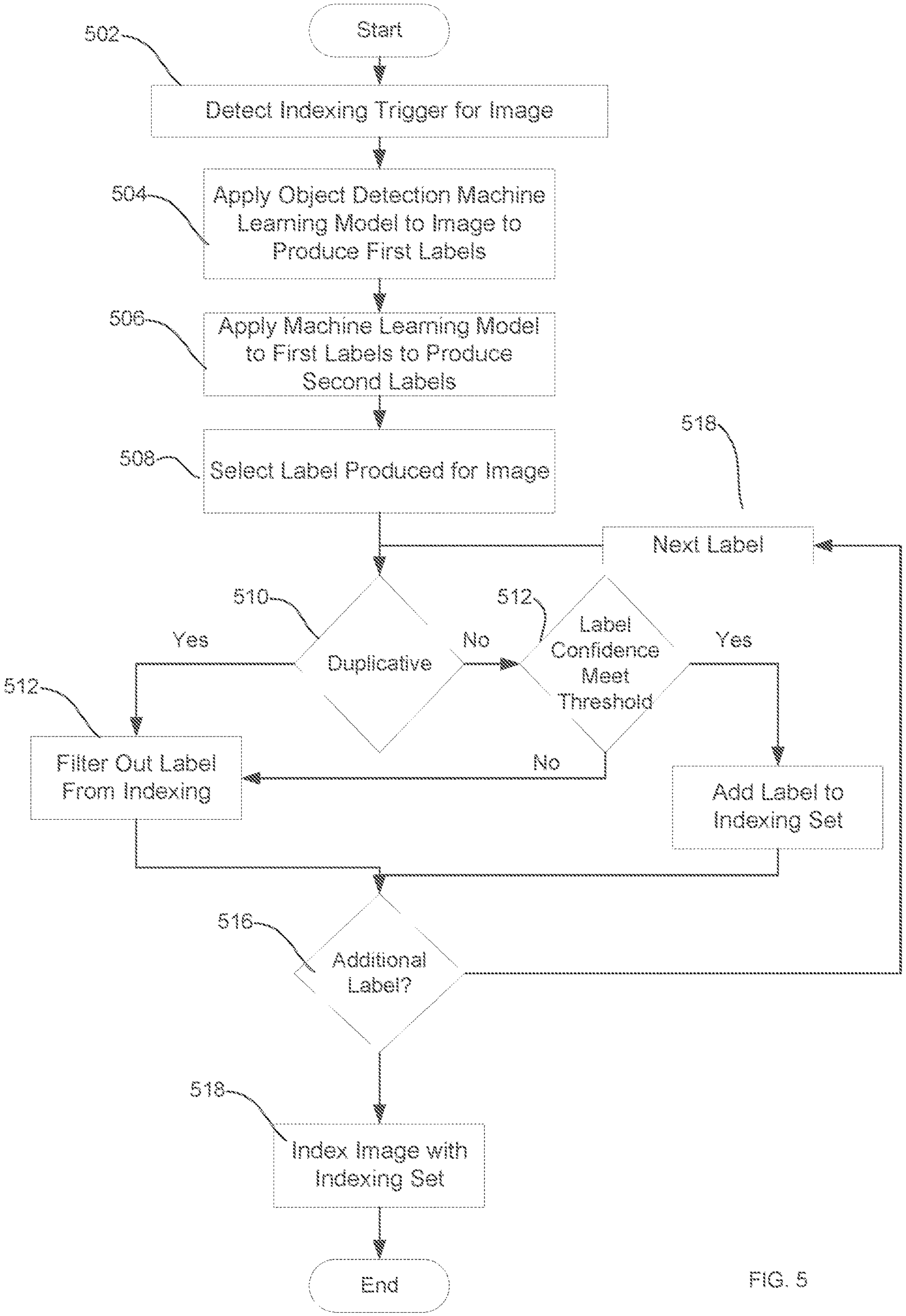
FIG. 5 is a flowchart illustrating one embodiment of a method for indexing image content.

FIG. 5 is a flowchart illustrating one embodiment of a method for indexing non-text content. In one embodiment, the steps of FIG. 5 may be embodied as computer-executable instructions stored on a non-transitory, computer-readable medium. For example, one or more steps of FIG. 5 may be implemented by content management system server 104, search engine 106, search agent 108, or image processing service worker 110.

At step 502, an image content indexing system detects a content indexing trigger. For example, content management system server 104 detects an event that triggers indexing of an image, such as client application 102 uploading an image for storage in repository 105 or modifying an image file stored in repository 105.

At step 504, the content search system performs object detection on the image to produce first labels. More particularly, the system processes the image using a machine learning object detection model trained to detect classes of objects in the image. According to one embodiment, the object detection model comprises a deep neural network machine learning model trained to infer objects from images. The object detection model produces first labels indicating classes of objects detected in the image, where each label includes an object class detected in the image. The object detection model may provide additional information for each label, such as probability (confidence) for the object class or a bounding box definition for an instance of the object class detected in the image. For example, image processing service worker 110 processes an image using object detection model 128.

At step 506, the content search system applies a second machine learning model to information related to the image to produce second labels, where the information related to the image includes the first labels. Other examples of information related to the image include, but are not limited to, bounding box definitions produced for the first labels, confidences produced for the first labels, metadata attributes associated with the image, or text extracted from the image. In one embodiment, the system applies the second machine learning model to infer actions represented in the image. For example, according to one embodiment, image processing service worker 110 inputs a feature vector representing the labels produced by object detection model 128 for the image into action detection model 130 for processing. In some embodiments, the feature vector also includes features representing one or more of: the bounding boxes associated with the labels produced by object detection model 128 for the image, the confidences associated with the labels produced by object detection model 128 for the image, metadata attributes of the image, text extracted image from the image, or other information related to the image.

The content search system then determines the labels with which to update a search index. More particularly, at step 508 the content search system selects a label produced for the image by the machine learning models and, at step 510, determines if the label is duplicative of another label selected for indexing. If the label is duplicative, the label is filtered out at step 512. For example, using the extracted metadata 300 of FIG. 3, search agent 108 filters out the second "Person" label as being duplicative of the first "Person" label. If the selected label is not duplicative, the content search system, at step 514 determines if the confidence assigned to the label by the machine learning model meets a confidence threshold. If the confidence assigned to the label does not meet the confidence threshold, the content search system filters out the label. For example, search agent 108 filters out the "Rafting" label of FIG. 3 due to the low probability assigned to the label. At step 516, if the label does meet the confidence threshold, the content search system adds the label to an indexing set. For example, search agent 108 marks or otherwise records the label as a label to include in an update request.

At step 518, the content search system updates the index using the determined indexing set of labels. For example, search agent 108 generates a request to update index 122 for content object 116, where the request includes the non-duplicative labels with sufficient confidence, produced by object detection model 128 and action detection model 130 for content file 120. Search agent 108 sends the index update request to indexing service 124 to cause search engine 106 to update index 122 for content object 116 with the labels (e.g., detected objects and actions) provided in the index update request.

FIG. 5 is merely an illustrative example, and the disclosed subject matter is not limited to the ordering or number of steps illustrated. Embodiments may implement additional steps or alternative steps, omit steps, or repeat steps.

Figure 6:
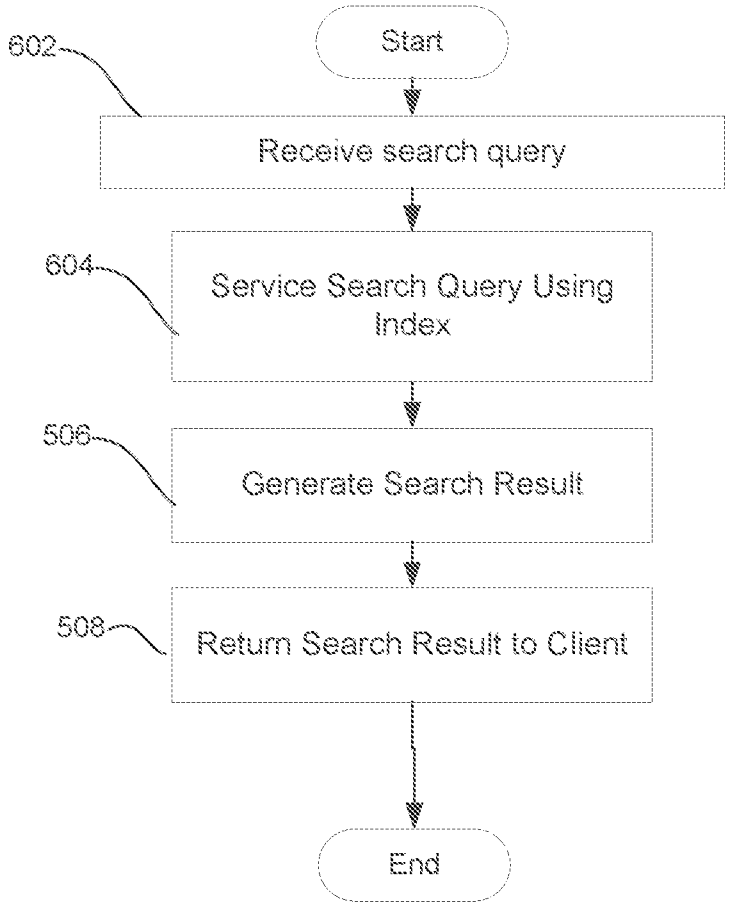
FIG. 6 is a flowchart illustrating one embodiment of a method for searching content, including image content.

FIG. 6 is a flowchart illustrating one embodiment of a method for searching content, including image content. In one embodiment, the steps of FIG. 6 may be embodied as computer-executable instructions stored on a non-transitory, computer-readable medium. For example, one or more steps of FIG. 6 may be implemented by content management system server 104, search engine 106 or search agent 108.

At step 602, a search query is received from a client where the search query includes search criteria, including a search term. For example, content management system server 104 receives a search query from client application 102.

The content search system then services the search query. At step 604, for example, the content search system uses the search index to search for content, including images, responsive to the search query. According to one embodiment, the content search system searches using the search term, synonyms of the search term, and lemmas to identify content, including images, responsive to the query. A search engine can identify an image as matching a search query based on the objects, actions or other labels or other information associated with the image in the index meeting the search criteria. According to one embodiment, an image can be identified as matching a search term based on an object, action or other label included in the search index for the image matching the search term or synonym of the search term, considering lemmas of the terms in the index, lemmas of the search terms or lemmas of the synonyms thereof in some embodiments.

For example, content management system server 104 forwards the query to search agent 108, which in turn provides the query terms to search query analyzer 126, and search query analyzer searches index 122 for content items associated with terms in index 122 that match the search terms or synonyms thereof, considering lemmas of the terms in index 122, lemmas of the search terms or lemmas of the synonyms thereof in some embodiments.

At step 606, the system generates a search result that includes responsive content, including, for example, images that match the search query. According to one embodiment, the search result includes links to images that match the search result. In another embodiment, the search result includes the images themselves. At step 608, the system returns a search result to the client application.

For example, search engine 106 returns a search result to search agent 108, where the search result includes a reference to the content objects that are responsive to the search query (e.g., by content object ids, URLs or other references), and search agent 108 returns the search result to content management system server 104. In one embodiment, content management system server 104 provides a search result to client application 102, where the search result includes references to the content objects that are responsive to the search query. In addition, or in the alternative, content management system server 104 retrieves the responsive image files and includes the images in the search results.

FIG. 6 is merely an illustrative example, and the disclosed subject matter is not limited to the ordering or number of steps illustrated. Embodiments may implement additional steps or alternative steps, omit steps, or repeat steps.

Figure 7:
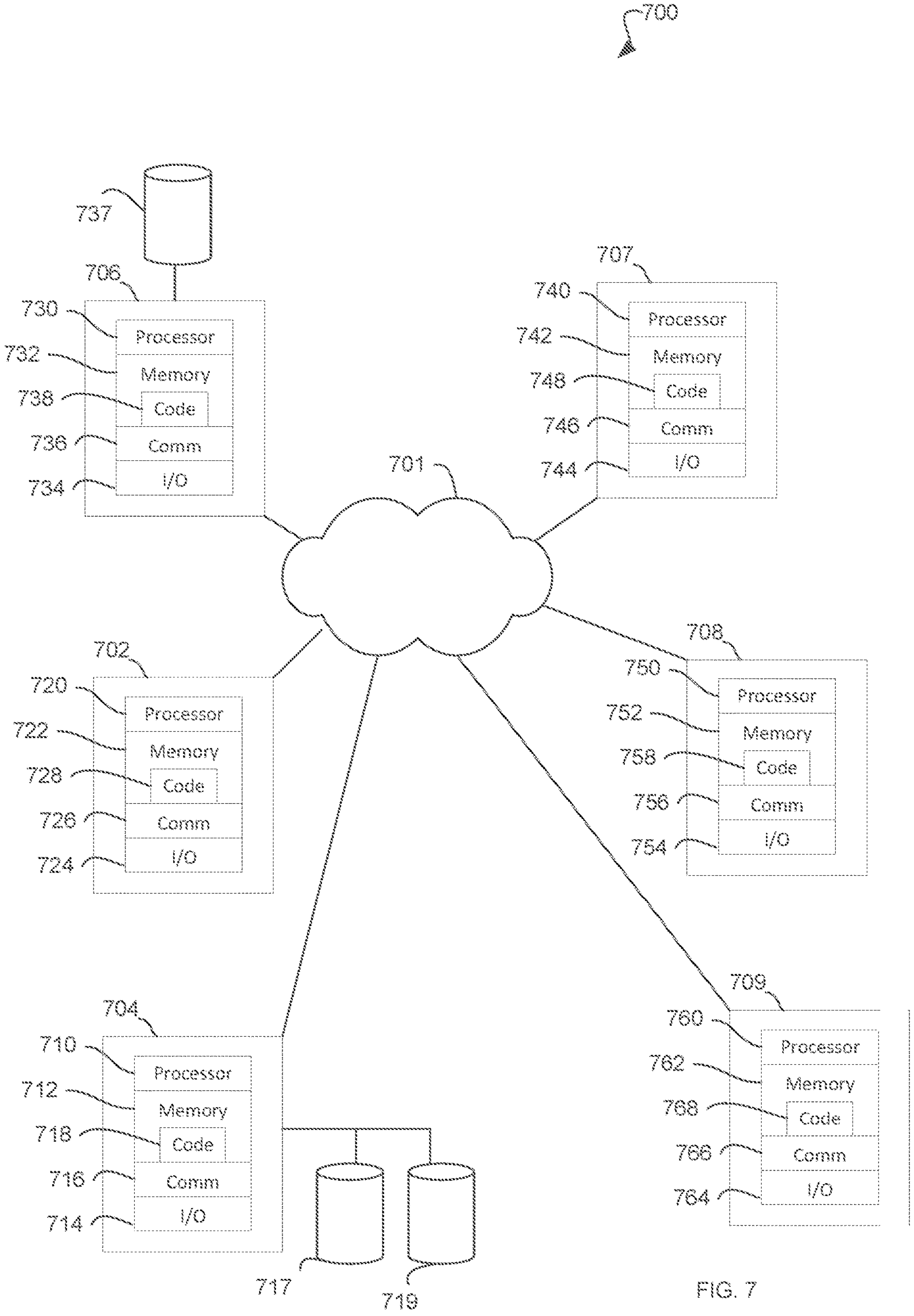
FIG. 7 is a diagrammatic representation of one embodiment of a distributed computer environment.

FIG. 7 is a diagrammatic representation of one embodiment of a distributed network computing environment 700. In the example illustrated, network computing environment 700 includes network 701 that can be bi-directionally coupled to a client computer system 702, a content management computer system 704, a search engine computer system 706, a messaging service server computer system 707, an image processing service computer system 708, and a search agent computer system 709. For the purpose of illustration, a single system is shown for each of client computer system 702, content management computer system 704, search engine computer system 706, messaging service server computer system 707, image processing service computer system 708, and search agent computer system 709. However, each of client computer system 702, content management computer system 704, search engine computer system 706, messaging service server computer system 707, image processing service computer system 708, and search agent computer system 709 may comprise a plurality of computers. Further, in some embodiments, various computer systems may be combined in one computer system. Network 701 represents a combination of wired and wireless networks that network computing environment 700 may utilize for various types of network communications known to those skilled in the art.

Content management computer system 704 comprises a computer processor 710 and associated memory 712. Computer processor 710 may be an integrated circuit for processing instructions, such as, but not limited to a central processing unit (CPU). Memory 712 may include volatile memory, non-volatile memory, semi-volatile memory or a combination thereof. Memory 712, for example, may include RAM, ROM, flash memory, a hard disk drive, a solid-state drive, an optical storage medium (e.g., CD-ROM), or other computer readable memory or combination thereof. Memory 712 implements a storage hierarchy that includes cache memory, primary memory and secondary memory. In some embodiments, memory 712 includes storage space on a data storage array. Content management computer system 704 may also include input/output ("I/O") devices 714, such as a keyboard, monitor, printer, electronic pointing device (e.g., mouse, trackball, stylus, etc.), or the like, and a communication interface 716, such as a network interface card, to interface with network 701.

Content management computer system 704 includes executable instructions 718 stored on a non-transitory computer readable medium coupled to computer processor 710. The computer executable instructions of content management computer system 704 are executable to provide one or more components of a content management system, such as content management system server 104. Executable instructions 718 are further executable to maintain a repository of managed content, such as repository 105. One or more components of content management computer system 704 may use a database 717 and file store 719 to provide a repository, such as repository 1004. Database 717 and file store 719, may be a portion of memory 712 or may be provided over a network by another computer system. In some embodiments, database 717 comprises a metadata store such as metadata store 112.

Client computer system 702 comprises a computer processor 720 and associated memory 722. Computer processor 720 may be an integrated circuit for processing instructions, such as, but not limited to a CPU. Memory 722 may include volatile memory, non-volatile memory, semi-volatile memory or a combination thereof. Memory 722, for example, may include RAM, ROM, flash memory, a hard disk drive, a solid-state drive, an optical storage medium (e.g., CD-ROM), or other computer readable memory or combination thereof. Memory 722 implements a storage hierarchy that includes cache memory, primary memory and secondary memory. In some embodiments, memory 722 includes storage space on a data storage array. Client computer system 702 may also include input/output ("I/O") devices 724, such as a keyboard, monitor, printer, electronic pointing device (e.g., mouse, trackball, stylus, etc.), or the like, and a communication interface 726, such as a network interface card, to interface with network 701.

Client computer system 702 includes executable instructions 728 stored on a non-transitory computer readable medium coupled to computer processor 720. The computer executable instructions of client computer system 702 are executable to provide a client application, such as client application 102, to allow a user to store content to and access content managed by the content management system.

Search engine computer system 706 comprises a computer processor 730 and associated memory 732. Computer processor 730 may be an integrated circuit for processing instructions, such as, but not limited to a CPU. Memory 732 may include volatile memory, non-volatile memory, semi-volatile memory or a combination thereof. Memory 732, for example, may include RAM, ROM, flash memory, a hard disk drive, a solid-state drive, an optical storage medium (e.g., CD-ROM), or other computer readable memory or combination thereof. Memory 732 implements a storage hierarchy that includes cache memory, primary memory and secondary memory. In some embodiments, memory 732 includes storage space on a data storage array. Search engine computer system 706 may also include input/output ("I/O") devices 734, such as a keyboard, monitor, printer, electronic pointing device (e.g., mouse, trackball, stylus, etc.), or the like, and a communication interface 736, such as a network interface card, to interface with network 701.

Search engine computer system 706 includes executable instructions 738 stored on a non-transitory computer readable medium coupled to computer processor 720. The computer executable instructions of search engine computer system 706 are executable to provide a search engine, such as search engine 106. One or more components of search engine computer system 706 may use a database 737 to provide a search index for content in a repository. Database 737 may be a portion of memory 732 or may be provided over a network by another computer system.

Messaging server computer system 707 comprises a computer processor 740 and associated memory 742. Computer processor 740 may be an integrated circuit for processing instructions, such as, but not limited to a CPU. Memory 742 may include volatile memory, non-volatile memory, semi-volatile memory or a combination thereof. Memory 742, for example, may include RAM, ROM, flash memory, a hard disk drive, a solid-state drive, an optical storage medium (e.g., CD-ROM), or other computer readable memory or combination thereof. Memory 742 implements a storage hierarchy that includes cache memory, primary memory and secondary memory. In some embodiments, memory 742 includes storage space on a data storage array. Messaging server computer system 707 may also include input/output ("I/O") devices 744, such as a keyboard, monitor, printer, electronic pointing device (e.g., mouse, trackball, stylus, etc.), or the like, and a communication interface 746, such as a network interface card, to interface with network 701.

Messaging server computer system 707 includes executable instructions 748 stored on a non-transitory computer readable medium coupled to computer processor 740. The computer executable instructions of messaging server computer system 707 are executable to provide a messaging service server, such as messaging server 111.

Image processing service computer system 708 comprises a computer processor 750 and associated memory 752. Computer processor 740 may be an integrated circuit for processing instructions, such as, but not limited to a CPU. Memory 752 may include volatile memory, non-volatile memory, semi-volatile memory or a combination thereof. Memory 752, for example, may include RAM, ROM, flash memory, a hard disk drive, a solid-state drive, an optical storage medium (e.g., CD-ROM), or other computer readable memory or combination thereof. Memory 752 implements a storage hierarchy that includes cache memory, primary memory and secondary memory. In some embodiments, memory 752 includes storage space on a data storage array. Image processing service computer system 708 may also include input/output ("I/O") devices 754, such as a keyboard, monitor, printer, electronic pointing device (e.g., mouse, trackball, stylus, etc.), or the like, and a communication interface 756, such as a network interface card, to interface with network 701.

Image processing service computer system 708 includes executable instructions 758 stored on a non-transitory computer readable medium coupled to computer processor 750. The computer executable instructions of image processing service computer system 708 are executable to provide an image processing service, including image processing service workers, such as image processing service worker 110, that utilize machine learning models to classify images.

Search agent computer system 709 comprises a computer processor 760 and associated memory 762. Computer processor 760 may be an integrated circuit for processing instructions, such as, but not limited to a CPU. Memory 762 may include volatile memory, non-volatile memory, semi-volatile memory or a combination thereof. Memory 762, for example, may include RAM, ROM, flash memory, a hard disk drive, a solid-state drive, an optical storage medium (e.g., CD-ROM), or other computer readable memory or combination thereof. Memory 762 implements a storage hierarchy that includes cache memory, primary memory and secondary memory. In some embodiments, memory 762 includes storage space on a data storage array. Search agent computer system 709 may also include input/output ("I/O") devices 764, such as a keyboard, monitor, printer, electronic pointing device (e.g., mouse, trackball, stylus, etc.), or the like, and a communication interface 766, such as a network interface card, to interface with network 701.

Search agent computer system 709 includes executable instructions 768 stored on a non-transitory computer readable medium coupled to computer processor 760. The computer executable instructions of search agent computer system 709 are executable to provide a search agent, such as search agent 108.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A content search system, comprising:
- a repository for storing content;
- an index database comprising a search index for the repository;
- a processor coupled to the repository and the index database;
- a computer memory storing code executable by the processor for:
  - accessing a selected image stored or to be stored in the repository;
  - applying a machine learning model to the selected image to detect objects and an action being performed in the selected image, wherein the machine learning model is trained to detect the objects and the action from individual images, wherein the selected image is an individual still image, and wherein applying the machine learning model comprises:
    - applying an object detection model trained to infer object classes to the selected image to detect the objects in the selected image and assign object class labels to the selected image indicating the objects detected in the selected image; and
    - applying an action detection model trained using the object classes to infer classes of actions being performed to the object class labels assigned by the object detection model to the selected image to detect the action being performed in the selected image and assign an action class label indicating the action being performed detected in the selected image; and
  - updating the search index to index the selected image using the objects and the action being performed detected in the selected image to enable searching of the selected image by the objects, and the action being performed detected in the selected image, wherein updating the search index comprises adding content indexing labels for the selected image to the search index, the content indexing labels comprising the object class labels indicating the objects detected in the selected image and the action class label indicating the action detected in the selected image.

2. The content search system of claim 1, wherein the code is further executable for:
- receiving a search query from a client;
- servicing the search query, servicing the search query comprising:
  - using the search index to search the repository;
  - determining that the selected image matches the search query based on the content indexing labels included for the selected image in the search index matching the search query;
  - based on a determination that the selected image matches the search query, generating a result that includes the selected image; and
  - returning the result to the client.

3. The content search system of claim 2, wherein the search query comprises a search term, and wherein determining that the selected image matches the search query comprises determining that the at least one of the content indexing labels matches the search term.

4. The content search system of claim 2, wherein:
- the search query comprises a search term;
- servicing the search query comprises expanding the search query to include a synonym of the search term; and
- determining that the selected image matches the search query based on the at least one of the content indexing labels matching the synonym of the search term.

5. The content search system of claim 1, wherein the code is executable for providing an image processing worker for:
- processing a content indexing request that includes a reference to the selected image in the repository; and
- servicing the content indexing request, wherein servicing the content indexing request comprises:
  - retrieving the selected image from the repository using the reference from the content indexing request;
  - the applying of the machine learning model to the selected image to detect the objects and the action being performed in the selected image; and
  - generating a content indexing response that comprises the content indexing labels.

6. The content search system of claim 5, wherein the code is executable for providing a search agent for:
- generating the content indexing request;
- receiving the content indexing response to the content indexing request;
- reading the content indexing labels from the content indexing response; and
- sending the content indexing labels read from the content indexing response to the index database to update the search index.

7. The content search system of claim 6, wherein:
- the search agent writes the content indexing request to a topic; and
- the image processing worker writes the content indexing response to the topic.

8. The content search system of claim 6, wherein the search agent and the image processing worker are asynchronous processes.

9. The content search system of claim 8, wherein the search agent sends the content indexing labels to the index database as atomic metadata.

10. The content search system of claim 9, wherein the code is further executable for translating the content indexing labels from a first language to a second language prior to updating the search index with the content indexing labels.

11. The content search system of claim 1:

wherein the object detection model is trained to perform a single object, or multiple-object, localization for instances of the object classes detected in the selected image; and wherein the action detection model is trained to infer a proximity of the instances of the object classes to each other in the selected image.

12. The content search system of claim 1, wherein the action detection model is trained to recognize actions using descriptive text from content object metadata, and from text extracted from the selected image using object character recognition, wherein low confidence objects are filtered from the selected image.

13. A computer-implemented method for content search, comprising:

accessing a selected image stored or to be stored in a repository that is searchable using a search index;

applying a machine learning model to detect objects and an action being performed in the selected image, wherein the machine learning model is trained to detect the objects and the action from individual images, wherein the selected image is an individual still image, and wherein applying the machine learning model comprises:

applying an object detection model trained to infer object classes to the selected image to detect the objects in the selected image and assign object class labels to the selected image indicating the objects detected in the selected image; and applying an action detection model trained using the object classes to infer classes of actions being performed to the object class labels assigned by the object detection model to detect the action being performed in the selected image and assign an action class label to the selected image indicating the action being performed detected in the selected image; and updating the search index to index the selected image using the objects and the action detected in the selected image to enable searching of the selected image by the objects and the action being performed, detected in the selected image, wherein updating the search index comprises adding content indexing labels for the selected image to the search index, the content indexing labels comprising the object class labels indicating the objects detected in the selected image and the action class label indicating the action being performed detected in the selected image.

14. The computer-implemented method of claim 13, further comprising:

receiving a search query from a client;

servicing the search query, servicing the search query comprising:

using the search index to search the repository;

determining that the selected image matches the search query based on at least one of the content indexing labels included for the selected image in the search index matching the search query;

based on a determination that the selected image matches the search query, generating a result that includes the selected image; and returning the result to the client.

15. The computer-implemented method of claim 14, wherein the search query comprises a search term, and wherein determining that the selected image matches the search query comprises determining that at least one of the content indexing labels matches the search term.

16. The computer-implemented method of claim 14, wherein:

the search query comprises a search term;

servicing the search query comprises expanding the search query to include a synonym of the search term; and determining that the selected image matches the search query comprises determining at least one of the content indexing labels matches the synonym of the search term.

17. The computer-implemented method of claim 13, further comprising:

processing a content indexing request that includes a reference to the selected image in the repository; and servicing the content indexing request, wherein servicing the content indexing request comprises:

using the reference from the content indexing request to retrieve the selected image from the repository;

the applying of the machine learning model to the selected image to detect the objects and the action being performed in the selected image; and generating a content indexing response that comprises the content indexing labels.

18. The computer-implemented method of claim 17, further comprising:

generating the content indexing request;

receiving the content indexing response to the content indexing request;

reading the content indexing labels from the content indexing response; and sending the content indexing labels read from the content indexing response to an index database to update the search index.

19. The computer-implemented method of claim 18, wherein a first process generates the content indexing request and a second process services the content indexing request and wherein the first process and second process are asynchronous processes.

20. The computer-implemented method of claim 19, further comprising:

the first process writing the content indexing request to a topic; and the second process reading the content indexing request from the topic.

21. The computer-implemented method of claim 18, wherein the content indexing labels are sent to the index database as atomic metadata.

22. The computer-implemented method of claim 13, further comprising translating the content indexing labels from a first language to a second language prior to updating the search index with the content indexing labels.

23. The computer-implemented method of claim 13:

wherein the object detection model is trained to perform a single object, or multiple-object, localization for instances of the object classes detected in the selected image; and wherein the action detection model is trained to infer a proximity of the instances of the object classes to each other in the selected image.

* * * * *